United States Patent [19]
Leung et al.

[11] Patent Number: 5,623,535
[45] Date of Patent: Apr. 22, 1997

[54] OPERATIONS OF CELLULAR COMMUNICATIONS SYSTEMS BASED ON MOBILITY AND TELETRAFFIC STATISTICS COLLECTED BY MOBILE UNITS

[75] Inventors: Kin K. Leung, Edison; Sanjiv Nanda, Plainsboro, both of N.J.; Kwan L. Yeung, Ngau Chi Wan, Hong Kong

[73] Assignee: Lucent Technologies Inc., Murray Hill, N.J.

[21] Appl. No.: 303,299

[22] Filed: Sep. 8, 1994

[51] Int. Cl.⁶ .................................................. H04Q 7/22
[52] U.S. Cl. ........................... 379/60; 379/59; 455/33.1; 455/33.2
[58] Field of Search ................................ 379/59, 60, 63; 455/33.1, 33.2, 54.1, 54.2, 56.1

[56] References Cited

U.S. PATENT DOCUMENTS

| | | | |
|---|---|---|---|
| 4,398,063 | 9/1983 | Hass et al. | 379/60 |
| 4,670,905 | 6/1987 | Sanovos et al. | 379/60 X |
| 5,020,091 | 5/1991 | Krolopp et al. | 379/58 |
| 5,200,957 | 4/1993 | Dahlin . | |
| 5,230,081 | 7/1993 | Yamada et al. . | |
| 5,235,633 | 8/1993 | Dennison et al. . | |
| 5,255,307 | 10/1993 | Mizikovsky . | |
| 5,265,263 | 11/1993 | Ramsdale et al. . | |
| 5,278,991 | 1/1994 | Ramsdale et al. | 379/60 X |
| 5,280,630 | 1/1994 | Wang | 455/56.1 |
| 5,289,525 | 2/1994 | Issenman et al. . | |
| 5,293,641 | 3/1994 | Kallin et al. . | |
| 5,295,180 | 3/1994 | Vendetti et al. . | |
| 5,305,308 | 4/1994 | English et al. . | |
| 5,371,780 | 12/1994 | Annitay | 379/58 |
| 5,379,446 | 1/1995 | Murase | 455/33.2 |
| 5,390,234 | 2/1995 | Bar-noy et al. | 379/59 |
| 5,392,453 | 2/1995 | Guomundson et al. | 455/33.2 |
| 5,432,842 | 7/1995 | Kinoshita et al. | 379/60 |
| 5,457,810 | 10/1995 | Ivanov et al. | 455/33.2 |

FOREIGN PATENT DOCUMENTS 558465  9/1993  European Pat. Off. ............... 379/60

OTHER PUBLICATIONS

Steele, Raymond, "The Cellular Environment of Lightweight Handheld Portables", *IEEE communications Magazine*, Jul. 1989, pp. 20–29.

Jolley et al, "Modelling and Analysis of Layered Cellular Mobile Networks", Teletraffic and Datatraffic, ITC–13, Elsevier Science Publishers B.V. (North Holland), IAC, 1991, pp. 161–166.

Sung et al, "User Speed Estimation and Dynamic Channel Allocation in Hierarchical Cellular System", The Chinese University of Hong Kong, IEEE, pp. 91–95, 1994.

*Primary Examiner*—Curtis Kuntz
*Assistant Examiner*—William G. Trost

[57] ABSTRACT

Each mobile unit in a cellular communications system accumulates at least one mobility or communications traffic (teletraffic) statistic representative of "typical" operation of the mobile unit within the cellular communications system. The mobile units process or collect the statistics and then transmit the aggregate statistics to a microcell or macrocell base station at time of origination of a call to or from the mobile, request for a handoff of a call by the mobile unit or the registration process. Included within the characteristics which can be monitored in accordance with the present invention are the following: cell sojourn time; area sojourn time; call holding times; call throughput; number of previous handoffs in an ongoing call; time periods between two consecutive failed handoffs for the mobile unit; and, the ratio of calls originating from a mobile unit to the number of calls terminating to a mobile unit. The accumulated data representative of these characteristics are utilized by the receiving base station to assign new and handoff calls to a microcell or a macrocell, to prioritize call handling within the cellular communications system and to assign customized customer service areas.

40 Claims, 7 Drawing Sheets

OPERATIONS OF CELLULAR COMMUNICATIONS SYSTEMS BASED ON MOBILITY AND TELETRAFFIC STATISTICS COLLECTED BY MOBILE UNITS

BACKGROUND OF THE INVENTION

The present invention relates in general to cellular communications or telephone systems and, more particularly, to methods for controlling the operations of such systems based on mobility and teletraffic statistics of mobile units operating within the system. In the present invention, mobile units collect their own mobility and teletraffic statistics and transmit aggregated statistics to base stations for control of the cellular system.

In state-of-the-art cellular communications or telephone systems, mobile units operating within a system monitor radio channels. The mobiles detect radio channels and accumulate data related to the radio channels such as signal strength, signal-to-noise ratio and the like. This information is provided to base stations distributed throughout the cellular system such that the mobile units assist in selection of appropriate channels and cells within the cellular system to help ensure the most satisfactory reception for each of the mobiles.

As the popularity of wireless communications increases, the number of mobile units within any given cellular system will also increase such that more mobile units will have to be handled by the cellular systems. One approach to increased capacity for handling higher mobile densities is the use of hierarchical architectures. In such architectures, a grid of microcells is overlaid with a grid of larger macrocells with overlapping coverage areas. Each microcell includes a base station which controls and coordinates mobile units within the microcell and each macrocell includes a base station which supervises mobile units under its control and coordinates a plurality of microcell base stations which are within the macrocell. When a mobile unit leaves one microcell and enters another microcell, it is handed-off from the base station of the first microcell to the base station of the second microcell. In areas where coverage is possible from either a microcell or a macrocell, the cellular system must determine whether to assign each call at origination and handoff, to a microcell or to a macrocell.

There is a need for an improved arrangement for controlling the operation of cellular systems which makes efficient use of network resources. Preferably, the improved arrangement would assist in determining whether a call, originating or handoff, should be assigned to a microcell or a macrocell in hierarchical architectures and not add substantially to the processing burden which is placed on microcell and macrocell base stations, and the network associated with a cellular system.

SUMMARY OF THE INVENTION

This need is met by the methods of the present invention wherein each mobile unit in a cellular communications system monitors and processes at least one mobility or communications traffic (teletraffic) statistic representative of representative operation of the mobile unit i.e., movement and calling patterns, within the cellular communications system. The statistics are processed by the mobile units and aggregated statistics are transmitted to base stations of microcells or macrocells, for example at times of origination of calls to or from the mobile units, requests for handoff by the mobile units, power-up, registration or location updates of the mobile units.

In existing cellular communications systems, the fixed network facilities are unable to collect and process mobility and teletraffic statistics for every mobile unit operating within the systems. This is particularly true if such data is to be collected and processed while the mobile units are engaged in existing calls and also while the mobile units are idle. Accordingly, existing cellular communications systems are unable to exploit such information in controlling the network resources. In the present invention, a number of statistics are collected and processed by intelligent mobile units such that they can be used to greatly improve efficiencies in resource management without undue additional burden on the network resources of the cellular communications systems.

Included within the statistics at least one of which is monitored by a mobile unit in accordance with the present invention are the following: cell sojourn time, e.g. the amount of time a mobile unit spends in a microcell; area sojourn time, i.e. the amount of time a mobile unit spends in a predefined geographical area referred to as a network service area; call holding times, i.e. the duration of time for calls of different types, such as voice, data, multimedia, etc.; call throughput, i.e. the average number of calls initiated from or terminated to a mobile unit per unit of time; number of previous handoffs in an ongoing call; time periods between two consecutive failed handoffs for the mobile, unit; and, the ratio of calls originating from a mobile unit to the number of calls terminating to a mobile unit.

The aggregated statistics are utilized by base stations of microcells or macrocells to assign new and handoff calls to a microcell or a macrocell, to prioritize call handling within the cellular communications system and to assign customized customer service areas for the mobile units.

In accordance with one aspect of the present invention, a method of operating a cellular communications system wherein distributed base stations couple a plurality of mobile units to a fixed switching network, the cellular communications system comprising a layered cellular mobile network having macrocells each of which overlies a plurality of microcells, comprises the steps of: controlling the connections of the plurality of mobile units from the distributed base stations based on measurable statistics of each of the plurality of mobile units; measuring microcell sojourn times at each of the plurality of mobile units as one of the measurable statistics; aggregating measured microcell sojourn times representative of mobile unit mobility at each of the plurality of mobile units; and, transmitting aggregated microcell sojourn times from the plurality of mobile units to the distributed base stations. For example, the aggregate statistic representing microcell sojourn times can be utilized to allocate a mobile unit call to either a microcell channel or a macrocell channel.

It is presently preferred to perform the step of aggregating microcell sojourn times by determining a mobility index $a_i$ by recursively computing $a_i = \alpha a_{i-1} + (1-\alpha)t_i$ where $a_i$ is the mobility index, $a_{i-1}$ is the preceding mobility index, $\alpha$ is a weighting factor ranging between 0 and 1, and $t_i$ is the time the mobile unit spent in a microcell between microcell crossings $i-1$ and $i$.

The method may further comprise the steps of: comparing each $t_i$ to $a_{i-1}$; delaying the step of recursively computing $a_i = \alpha a_{i-1} + (1-\alpha)t_i$ until $t_{i+1}$ is determined if a $t_i$ is substantially greater than $a_{i-1}$, recursively computing $a_i = \alpha a_{i-1} + (1-\alpha)t_i$ if $t_{i+1}$ is also substantially greater than $a_{i-1}$; and, deleting a $t_i$ which is substantially greater than $a_{i-1}$ prior to recursively computing $a_i=\alpha a_{i-1}+(1-\alpha)t_i$ if $t_{i+1}$ is not substantially greater than $a_{i-1}$. These steps exclude an individual $t_i$ which is a large outlier from being included in the determination of the mobility index $a_i$. The step of recursively computing $a_i=\alpha a_{i-1}+(1-\alpha)t_i$ if $t_{i+1}$ is also substantially greater than $a_{i-1}$ preferably is performed using both $t_i$ and $t_{i+1}$.

The method may also further comprise the steps of comparing each $t_i$ to $a_{i-1}$ delaying the step of recursively computing $a_i=\alpha a_{i-1}+(1-\alpha)t_i$ until $t_{i+1}$ is determined if a $t_i$ is substantially less than $a_{i-1}$; recursively computing $a_i=\alpha a_{i-1}+(1-\alpha)t_i$ if $t_{i+1}$ is also substantially less than $a_{i-1}$; and deleting a $t_i$ which is substantially less than $a_{i-1}$ prior to recursively computing $a_i=\alpha a_{i-1}+(1-\alpha)t_i$ if $t_{i+1}$ is not substantially less than $a_{i-1}$. These steps exclude an individual $t_i$ which is a small outlier from being included in the determination of the mobility index $a_i$. The step of recursively computing $a_i=\alpha a_{i-1}+(1-\alpha)t_i$ if $t_{i-1}$ is also substantially less than $a_{i-1}$ preferably is performed using both $t_i$ and $t_{i+1}$.

For allocation of a call to a microcell or a macrocell, the method further comprises the steps of: comparing aggregated microcell sojourn times to a threshold; routing calls through appropriate microcells if aggregated microcell sojourn times are greater than the threshold; and, routing calls through appropriate macrocells if aggregated microcell sojourn times are less than the threshold.

The method may further comprise the steps of: performing the steps of measuring microcell sojourn times, and aggregating microcell sojourn times at each of the plurality of mobile units whenever a mobile unit is powered-up; performing the step of transmitting aggregated microcell sojourn times of the mobile units from the plurality of mobile units to the distributed base stations at times of call set-up; and, performing the step of comparing aggregated microcell sojourn times to a threshold such that initial call set-up is determined based on the aggregated microcell sojourn times to set-up calls on appropriate microcells if aggregated microcell sojourn times for mobile units are greater than the threshold and to set-up calls on appropriate macrocells if aggregated microcell sojourn times for mobile units are less than the threshold.

The method may further comprise the steps of: continuing to perform the steps of measuring microcell sojourn times, and aggregating microcell sojourn times at each of the plurality of mobile units during the progress of established calls connected over the cellular communications system; performing the step of transmitting aggregated microcell sojourn times of the mobile units from the plurality of mobile units to the distributed base stations at times of microcell boundary crossings; performing the step of comparing aggregated microcell sojourn times to a threshold; and, handing off established calls based on the aggregated microcell sojourn times. Preferably, the step of handing off established calls based on the aggregated sojourn times comprises the steps of: handing off calls from one microcell to another microcell if aggregated microcell sojourn times for mobile units is greater than the threshold; handing up calls from one microcell to a macrocell if aggregated microcell sojourn times for mobile units is less than the threshold; handing off calls from one macrocell to another macrocell if aggregated microcell sojourn times for mobile units is less than the threshold; and, handing down calls from one macrocell to a microcell if aggregated microcell sojourn times for mobile units is greater than the threshold.

Alternately, the method may further comprise the steps of: performing the steps of measuring microcell sojourn times, and aggregating microcell sojourn times at each of the plurality of mobile units whenever a mobile unit is powered-up; performing the step of transmitting aggregated microcell sojourn times of the mobile units from the plurality of mobile units to the distributed base stations at times of call set-up; comparing aggregated microcell sojourn times to an origination threshold between a low threshold and a high threshold; routing calls through appropriate microcells if aggregated microcell sojourn times are greater than the origination threshold; and, routing calls through appropriate macrocells if aggregated microcell sojourn times are less than the origination threshold. For this alternate, the method may further comprise the steps of: continuing to perform the steps of measuring microcell sojourn times, and aggregating microcell sojourn times at each of the plurality of mobile units during the progress of established calls connected over the cellular communications system; performing the step of transmitting aggregated microcell sojourn times of the mobile units from the plurality of mobile units to the distributed base stations at times of microcell boundary crossings; and, handing off established calls based on the aggregated microcell sojourn times.

Preferably, the step of handing off established calls based on the aggregated microcell sojourn times comprises the steps of: comparing aggregated microcell sojourn times to said low threshold; comparing aggregated microcell sojourn times to said high threshold; handing off calls from one microcell to another microcell if aggregated microcell sojourn times for mobile units are greater than the low threshold; handing up calls from one microcell to a macrocell if aggregated microcell sojourn times for mobile units are less than the low threshold; handing off calls from one macrocell to another macrocell if aggregated microcell sojourn times for mobile units are less than the high threshold; and, handing down calls from one macrocell to a microcell if aggregated microcell sojourn times for mobile units are greater than the high threshold.

The method may further comprise the steps of: accumulating call holding times at each of the plurality of mobile units as one of the measurable statistics; aggregating call holding times at each of the plurality of mobile units; and, transmitting aggregated call holding times to the distributed base stations. The step of aggregating call holding times at each of the plurality of mobile units may comprise the step of determining a weighted average by recursively computing $b_i=\beta b_{i-1}+(1-\beta)h_i$ where $b_i$ is a weighted average of call holding time, $b_{i-1}$ is the preceding weighted average of call holding time, $\beta$ is a weighting factor ranging between 0 and 1, and $h_i$ is the holding time of the $i^{th}$ call.

To facilitate transmission and more efficiently utilize computation and switching costs, the method may further comprise the step of: dividing $b_i$ by $a_i$ to determine a ratio representative of the expected number of handoffs for each call wherein the steps of transmitting aggregated microcell sojourn times representative of the mobilities of the mobile units from the plurality of mobile units to the distributed base stations and transmitting aggregated call holding times to the distributed base stations are combined and simplified by transmitting the ratio of $b_i/a_i$. For this aspect of the invention, the method further comprises the steps of: comparing the ratio of $b_i/a_i$ to a selected handoff threshold; assigning a call to a macrocell channel if $b_i/a_i$ exceeds the handoff threshold; and, assigning a call to a microcell channel if $b_i/a_i$ does not exceed the handoff threshold.

In accordance with another aspect of the present invention, a method of operating a cellular communications system wherein distributed base stations couple a plurality of mobile units to a fixed switching network, the cellular communications system comprising a layered cellular mobile network having macrocells each of which overlies a plurality of microcells, comprises the steps of: controlling the connections of established calls on the plurality of mobile units from the distributed base stations based on measurable statistics of each of the plurality of mobile units; accumulating the number of previous handoffs for each call at each of the plurality of mobile units as one of the measurable statistics; transmitting the number of previous handoffs with each request for a handoff; comparing the number of previous handoffs for each call to a defined threshold; and, allocating a macrocell channel to calls in which the number of previous handoffs exceeds a defined handoff threshold.

In accordance with yet another aspect of the present invention, a method of operating a cellular communications system wherein distributed base stations couple a plurality of mobile units to a fixed switching network comprises the steps of: controlling system resource allocation for each of the plurality of mobile units from the distributed base stations based on measurable communications statistics representative of each of the plurality of mobile units; collecting measurable communications statistics representative of each of the plurality of mobile units at each of the plurality of mobile units; and, transmitting the measurable communications statistics representative of each of the plurality of mobile units from the plurality of mobile units to the distributed base stations.

The method may further comprise the step of setting a customer service area based on the measurable communications statistics. The step of collecting measurable communications statistics representative of each of the plurality of mobile units at each of the plurality of mobile units may comprise the step of collecting call holding times for each of the plurality of mobile units, with the step of setting a customer service area being based on collected call holding times.

Alternately, the step of collecting measurable communications statistics representative of each of the plurality of mobile units at each of the plurality of mobile units may comprise the step of collecting call types for each of the plurality of mobile units, with the step of setting a customer service area being based on collected call types.

The step of collecting measurable communications statistics representative of each of the plurality of mobile units at each of the plurality of mobile units may also comprise the step of collecting the number of calls originated by each of the plurality of mobile units and the number of calls received by each of the plurality of mobile units. For this case, the step of setting a customer service area is based on the collected number of calls originated by each of the plurality of mobile units and the number of calls received by each of the plurality of mobile units.

In addition, the step of collecting the measurable communications statistics representative of each of the plurality of mobile units at each of the plurality of mobile units may comprise the step of collecting call throughput for each of the plurality of mobile units, with the step of setting a customer service area being based on the collected call throughput for each of the plurality of mobile units.

The step of collecting the measurable communications statistics representative of each of the plurality of mobile units at each of the plurality of mobile units also may comprise the step of collecting service area sojourn times for each of the plurality of mobile units, with the step of setting a customer service area being based on the collected service area sojourn times for each of the plurality of mobile units.

The method may further comprise the steps of: controlling the connections of the plurality of mobile units from the distributed base stations based on measurable statistics of each of the plurality of mobile units; collecting data representative of the measurable statistics of each of the plurality of mobile units at each of the plurality of mobile units; and, transmitting data representative of the measurable statistics of each of the plurality of mobile units from the plurality of mobile units to the distributed base stations.

Where the cellular communications system comprises a layered cellular mobile network comprising macrocells each of which overlies at least two microcells, the step of collecting data representative of the measurable statistics of each of the plurality of mobile units at each of the plurality of mobile units may comprise the step of collecting mobility data. The method may further comprise the steps of comparing mobility data to a threshold; routing calls through an appropriate microcell if mobility data for mobile units is greater than the threshold; and, routing calls through an appropriate macrocell if mobility data for mobile units is less than the threshold.

The method may further comprise the steps of: performing the step of collecting data representative of the measurable statistics of each of the plurality of mobile units at each of the plurality of mobile units whenever a mobile unit is powered-up; performing the step of transmitting data representative of the measurable statistics of each mobile unit at time of call set-up; and, performing the step of comparing mobility data to a threshold such that initial call set-up is determined based on the mobility data to set-up calls on an appropriate microcell if mobility data for mobile units is greater than the threshold and to set-up calls on an appropriate macrocell if mobility data for mobile units is less than the threshold.

Preferably, the method may further comprise the steps of: continuing to perform the step of collecting data representative of the measurable statistics of each of the plurality of mobile units at each of the plurality of mobile units during established calls; performing the step of transmitting data representative of the measurable statistics of each mobile unit at times of microcell boundary crossings; performing the step of comparing mobility data to a threshold; and, handing off established calls based on the mobility data. The step of handing off established calls based on the mobility data may comprise the steps of: handing off calls from one microcell to another microcell if mobility data for mobile units is greater than the threshold; handing up calls from one microcell to a macrocell if mobility data for mobile units is less than the threshold; handing off calls from one macrocell to another macrocell if mobility data for mobile units is less than the threshold; and, handing down calls from one macrocell to a microcell if mobility data for mobile units is greater than the threshold.

In accordance with still another aspect of the present invention, a method of operating a cellular communications system wherein distributed base stations couple a plurality of mobile units to a fixed switching network comprises the steps of: controlling connections of the plurality of mobile units from the distributed base stations based on measurable statistics of each of the plurality of mobile units; accumulating microcell sojourn times at each of the plurality of mobile units as one of the measurable statistics; taking a weighted average of microcell sojourn times representative of mobile unit mobility at each of the plurality of mobile units; transmitting weighted averages of microcell sojourn times representative of the mobilities of the mobile units from the plurality of mobile units to the distributed base stations; and, prioritizing the order of performing connections of the plurality of mobile units based on the weighted averages of microcell sojourn times.

In accordance with yet still another aspect of the present invention, a method of operating a cellular communications system wherein distributed base stations couple a plurality of mobile units to a fixed switching network comprises the steps of: controlling connections of the plurality of mobile units from the distributed base stations based on measurable statistics of each of the plurality of mobile units; accumulating time intervals between two consecutive calls at each of the plurality of mobile units as one of the measurable statistics; taking a weighted average of accumulated time intervals between two consecutive calls at each of the plurality of mobile units; accumulating time intervals between two consecutive calls which fail at handoff at each of the plurality of mobile units; taking a weighted average of the time intervals between two consecutive calls which fail at handoff at each of the plurality of mobile units; transmitting the ratio of weighted averages of accumulated time intervals between two consecutive calls to weighted averages of time intervals between two consecutive calls which fail at handoff from the plurality of mobile units to the distributed base stations; and, prioritizing the order of performing connections of the plurality of mobile units based on the ratio of the weighted averages of accumulated time intervals between two consecutive calls to weighted averages of time intervals between two consecutive calls which fail at handoff.

In accordance with an additional aspect of the present invention, a method of operating a cellular communications system wherein distributed base stations couple a plurality of mobile units to a fixed switching network comprises the steps of: controlling connections of said plurality of mobile units from said distributed base stations based on measurable statistics of each of said plurality of mobile units; accumulating mobility data at each of said plurality of mobile units as one of said measurable statistics; taking a weighted average of accumulated mobility data at each of said plurality of mobile units; transmitting the weighted averages of accumulated mobility data from said plurality of mobile units to said distributed base stations; and, prioritizing the order of performing connections of said plurality of mobile units based on the weighted averages of accumulated mobility data.

It is, thus, an object of the present invention to provide improved methods for controlling operation of cellular communications systems to reduce the number of handoffs, to simplify handoff procedures and to improve customer perception of service quality; to provide improved methods for controlling operation of cellular communications systems by monitoring, processing and transmitting at least one mobility or teletraffic statistic representing "typical" operation of mobile units within the cellular communications system to a microcell or macrocell base station for setting up new and/or handoff calls; to provide improved methods for controlling operation of cellular communications systems by defining customized customer service areas; and, to provide improved methods for controlling operation of cellular communications systems by monitoring, processing and transmitting at least one mobility or teletraffic statistic representing "typical" operation of mobile units within the cellular communications system to a microcell base station or a macrocell base station for prioritizing operations within the cellular communications system.

Other objects and advantages of the invention will be apparent from the following description, the accompanying drawings and the appended claims.

DETAILED DESCRIPTION OF THE INVENTION

Figure 1:
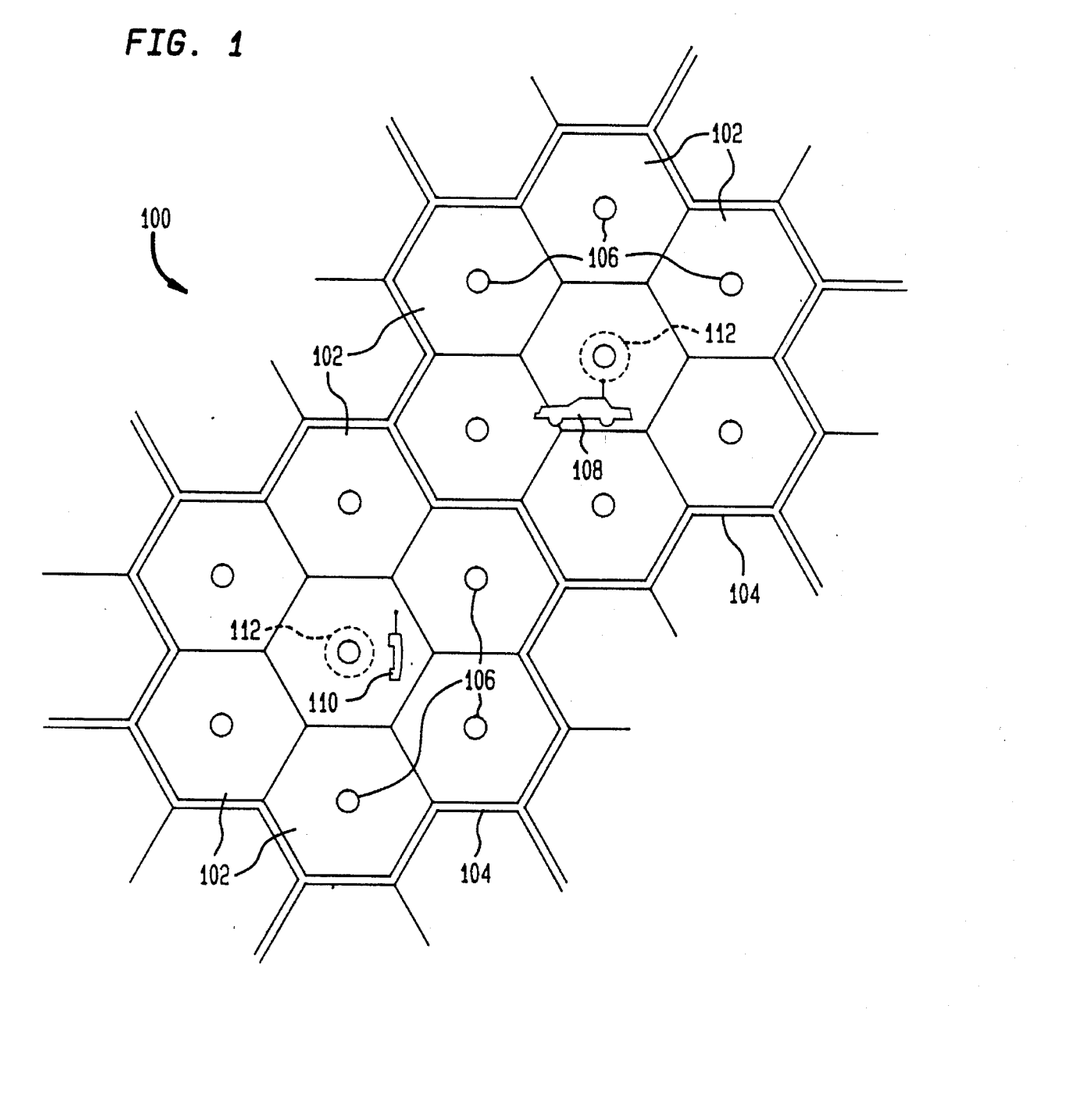
FIG. 1 illustrates a portion of a cellular communications system which can be operated in accordance with the present invention.

FIG. 1 is a schematic diagram of a cellular communications system 100 having a hierarchical architecture wherein a grid of microcells 102 is overlaid with a grid of larger macrocells 104 with overlapping coverage areas. The schematic diagram of FIG. 1 is idealized in that it shows the microcells 102 as hexagons and the overlying macrocells 104 as coinciding identically with the outlines of the microcells 102 they overlap with both the microcells 102 and the macrocells 104 having ideally centered base stations. Of course, in the real world, particularly in urban areas where a hierarchical architecture is likely be used, microcells and macrocells are not so ideally formed nor do they have their base stations so ideally located.

In any event, as illustrated in FIG. 1, the macrocells 104 are enclosed by heavier lines. Each of the microcells 102 has a base station 106 which controls and coordinates mobile units within the microcell, such as a mobile unit 108 mounted in a vehicle and a mobile unit 110 which, for example, may be carried by a pedestrian or used in a building positioned within the cellular communications system 100. Each of the macrocells 104 includes a base station 112 which supervises mobile units under its control and coordinates a plurality of the microcell base stations 106 which are within the macrocell. Each of the microcell base stations 106 and the macrocell base stations 112 are ultimately connected to a fixed switching network, such as the public switched telephone network, through a mobile switching center in a known manner.

In cellular communications systems, for calls to be maintained as mobile units move between cells of the system, a handover operation must be performed from a current cell from which a mobile unit is exiting to a new cell into which the mobile unit is moving. After a call is set up, the quality of the radio channel being used is monitored by the mobile unit and the associated base station. Additional detectable radio channels are also monitored as potential candidates for handover of the call. According to established criteria, the call is handed over for control by another base station to maintain a high quality of transmission for the call.

In cellular communications systems having a hierarchical architecture including microcells and overlying macrocells, such as the cellular communications system 100 of FIG. 1, another dimension is added since a call can be handled by either one of the microcells 102 or by one of the macrocells 104 which encompasses a microcell within which a mobile is located.

One arrangement for controlling a hierarchical architecture communications system is disclosed in U.S. Pat. No. 5,265,263. In the '263 patent, movement of a mobile is detected by bit error rates or low field strength for a microcell channel assigned to an established call. If movement is detected, the call is handed over to an "umbrella" channel common to a number of microcells such that handoffs among the microcells can be quickly accomplished.

In accordance with the present invention, a number of mobility and teletraffic statistics for each mobile within a cellular communications system are monitored, accumulated and processed by the mobile units themselves. This arrangement provides efficient allocation of system resources including assignment of radio channels to new and handoff calls, and reduction of location updates for location tracking management.

One or more of the following parameters are to be monitored for use in the present invention: cell sojourn time, i.e. the amount of time a mobile unit spends in a microcell; area sojourn time, i.e. the amount of time a mobile unit spends in a defined network service area; call holding times, i.e. the time durations of calls of all types which are connected to a mobile unit, such as voice, data and multimedia calls; call throughput, i.e. the average number of calls initiated from or terminated to a mobile unit per unit time; the number of previous handoffs required for an ongoing call; the average number of handoffs per call; the holding time per call on an ongoing call basis; the time intervals between two failed handoffs associated with a mobile unit; and, the ratio of originating calls to terminating calls, i.e. the ratio of throughput of calls initiated from a mobile unit to calls terminated to the mobile unit.

In addition, practical ways will be disclosed for transmitting these parameters or an aggregated summary from the mobile units to microcell or macrocell base stations serving the mobile units where they are used, for example, in mobile unit registration and processing new call setup or handoff requests. The usage of these parameters, which are representative of mobile and teletraffic statistics of each mobile unit within a cellular communications system, and their transmission within a cellular communications system will now be described. Several ways of utilizing the accumulated statistics of the mobile units will be presented; however, it is to be understood that additional ways of utilizing the accumulated statistics will be suggested to those skilled in the art for further optimization of resource allocation and operation of cellular communications systems.

Figure 2:
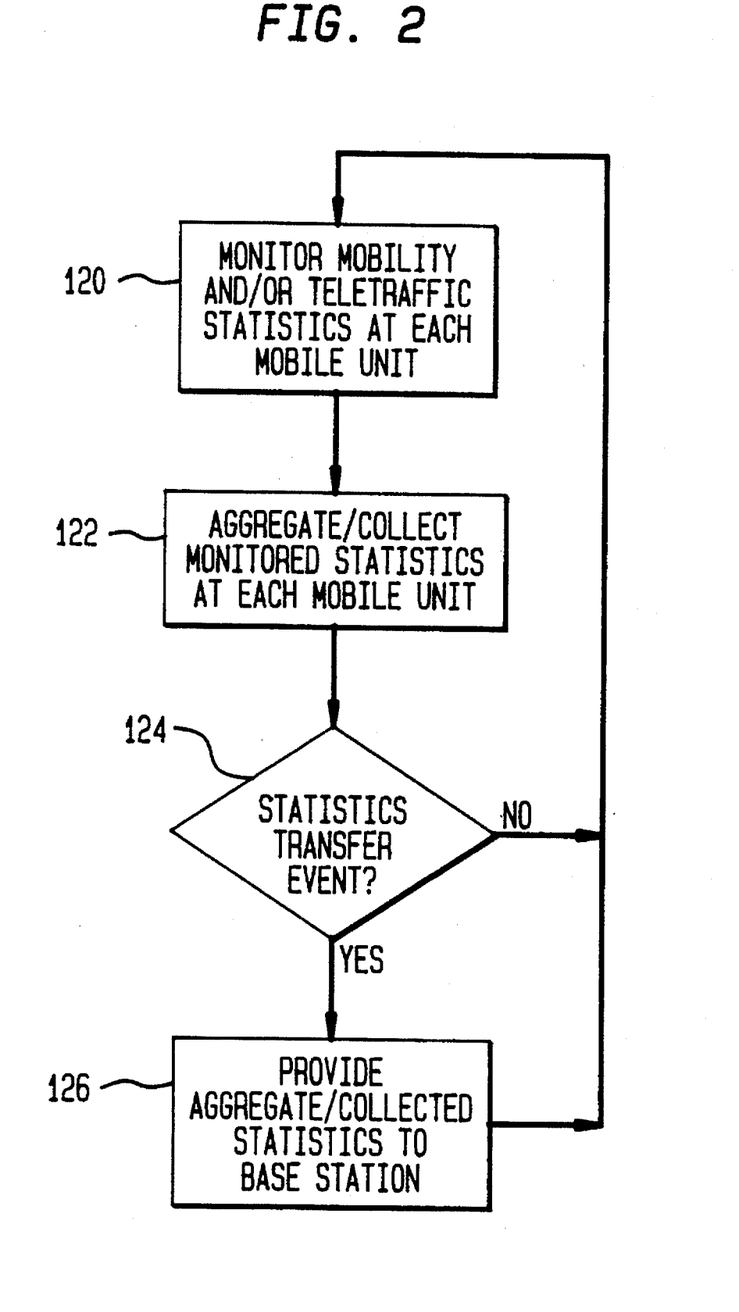
FIG. 2 is a flow chart showing generalized operation of mobile units operating within a cellular communications system in accordance with the present invention.

FIG. 2 broadly illustrates operation of individual mobile units in accordance with the present invention. In particular, mobility and/or teletraffic statistics are monitored at each mobile unit, see block 120. The statistics are collected and/or processed by each mobile unit to generate collected or aggregate statistics for monitored mobility and/or teletraffic statistics, see block 122. Each mobile unit determines whether the monitored statistic which triggered activity in the mobile unit is an event which triggers a statistics transfer event, such as call origination, handoff or registration, see block 124. If no statistics transfer is required, monitoring resumes; otherwise, aggregate-collected statistics are provided to a microcell or macrocell base station as appropriate, see block 126. The monitoring of specific statistics in accordance with the present invention will now be described.

Figure 3A:
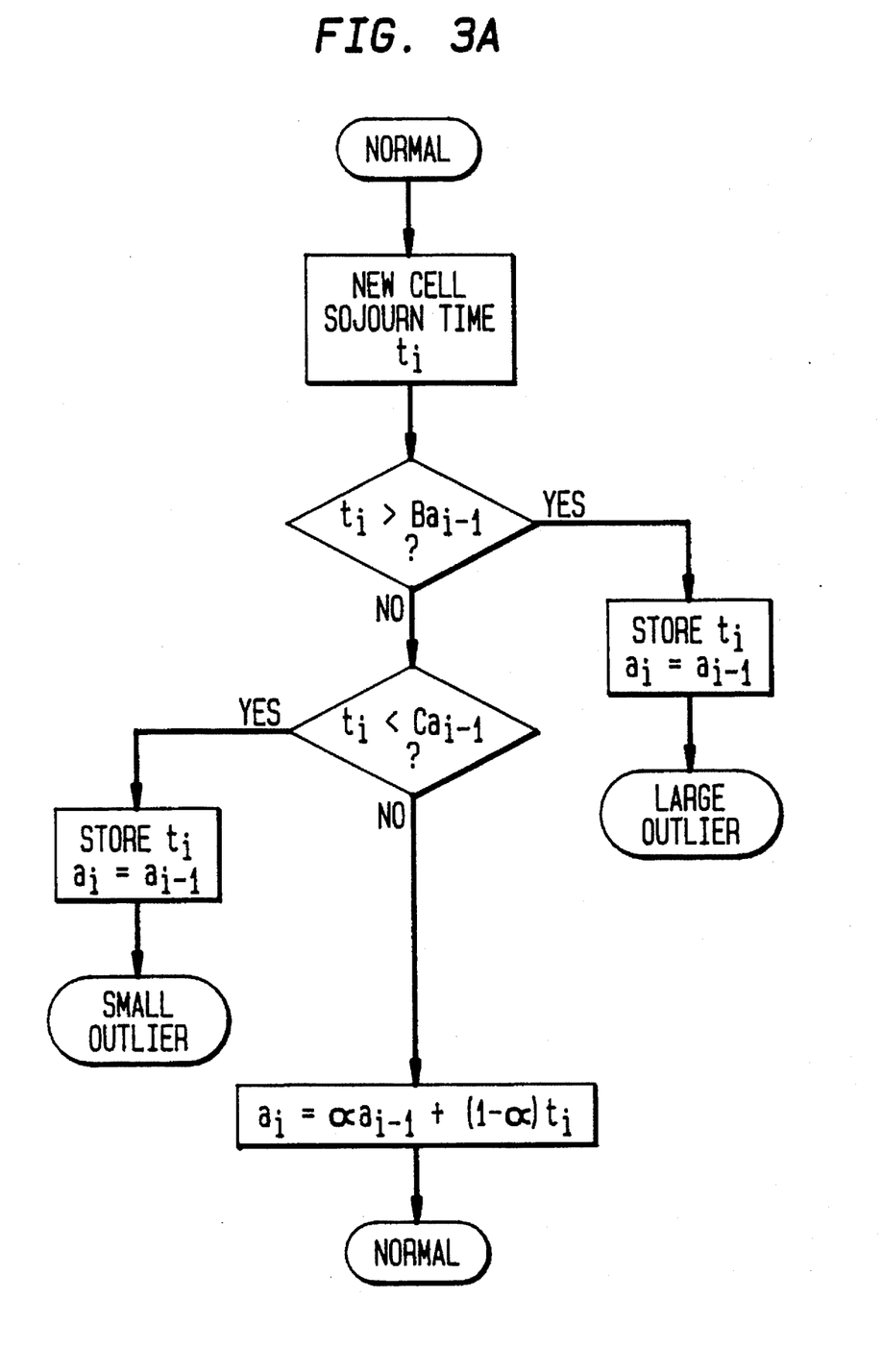
FIGS. 3a–3c are flow charts showing aggregation of mobility statistics within mobile units including the exclusion of outliers from the aggregate statistics.

The cell sojourn times during which a mobile unit is locked to a microcell control channel between microcell crossings i-1 and i are monitored and aggregated by each mobile unit and designated as $\{t_i: i=1,2,3,\ldots\}$. The cell or microcell sojourn times are representative of the mobility of a mobile unit. Accordingly, the aggregated cell sojourn time is referred to as a mobility index for each mobile unit and is defined in one embodiment of the present invention as the weighted average of $\{t_i\}$: $a_i = \alpha a_{i-1} + (1-\alpha)t_i$ where $0 \leq \alpha < 1$ and is recursively computed by each mobile unit as new $t_i$'s arise, see FIG. 3a. When a mobile unit places a new call, a statistics transfer event, the current value of the mobility index $a_i$ is forwarded to either a microcell base station or a macrocell base station in the call setup request, see FIG. 2.

By comparing $a_i$ with a defined threshold $\tau$, the receiving base station, either a microcell base station or a macrocell base station, determines whether to allocate a microchannel, i.e., a microcell channel (μch), or a macrochannel, i.e., a macrocell channel (Mch), to the call. If $a_i$ is greater than $\tau$, a microcell channel is assigned; otherwise the call is set-up on a channel of the overlaid macrocell. The mobility index $a_i$ is monitored by the mobile unit during the progress of a call also. That is, the mobile unit tracks microcell boundary crossings even if it has a call up on a macrocell channel. Thus, any changes in $a_i$ during a call can be reflected in the reassignment of the call from a macrocell to a microcell, a call hand-down, or from a microcell to a macrocell, a call hand-up. In this way, erroneous assignments to macrocells or microcells can be corrected as the calls progress in accordance with this aspect of the present invention.

Figure 4:
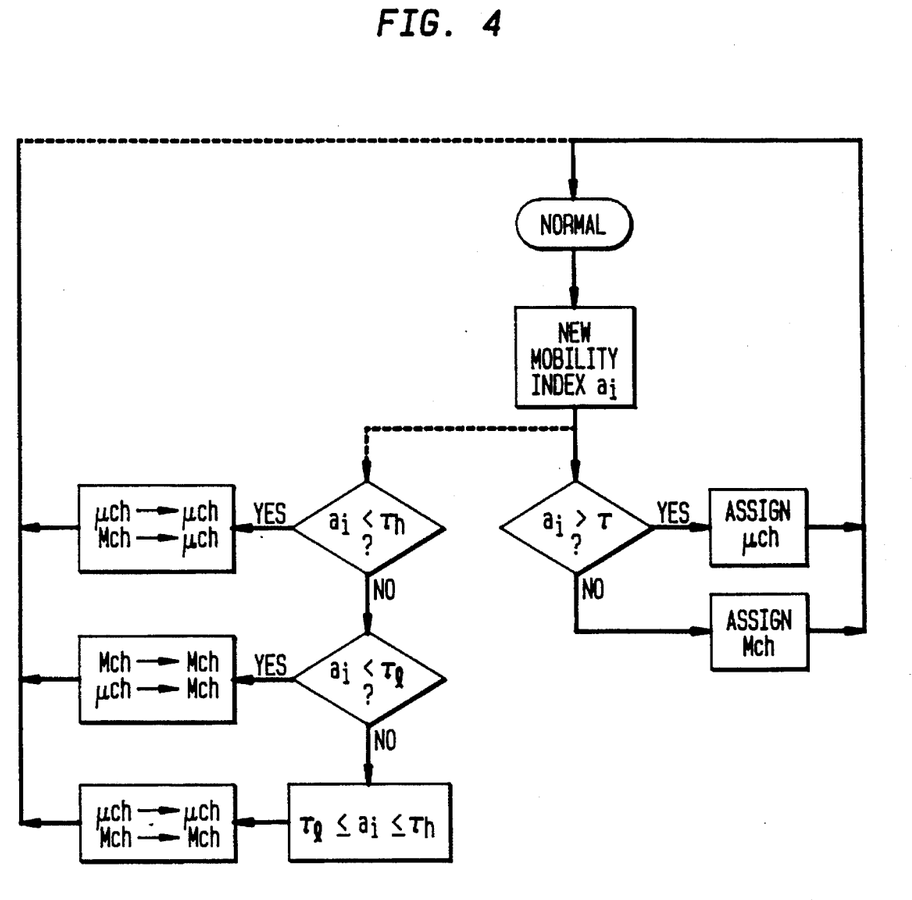
FIG. 4 is a flow chart showing assignment of a microchannel or a macrochannel based on a mobility index collected in accordance with the present invention by mobile units.

A single defined threshold $\tau$ may be appropriate for some cellular communications systems wherein frequent shifts due to minor variations around the threshold $\tau$ are easily accommodated and do not tend to deteriorate system performance. However, in many systems, such frequent shifts are to be avoided and, to this end, defined high and low thresholds, $\tau_h$ and $\tau_l$, are provided for determining when to perform a hand-down or a hand-up. For handling established calls with high and low thresholds, $\tau_h$ and $\tau_l$: calls are handed off from one microcell to another microcell if the mobility indices $a_i$'s for mobile units are greater than the low threshold $\tau_l$; calls are handed up from one microcell to a macrocell if the mobility indices $a_i$'s for mobile units are less than the low threshold $\tau_l$; calls are handed off from one macrocell to another macrocell if the mobility indices $a_i$'s for mobile units are less than the high threshold $\tau_h$; and, calls are handed down from one macrocell to a microcell if the mobility indices $a_i$'s for mobile units are greater than the high threshold $\tau_h$, see FIG. 4.

When high and low thresholds, $\tau_h$ and $\tau_l$, are used for handling established calls are described, an origination threshold $\tau_o$ is selected between the high and low thresholds, $\tau_h$ and $T_l$. It is currently preferred to select the origination threshold $T_o$ somewhere near the midpoint between the high and low thresholds, $T_h$ and $T_l$, although other points may be preferred for given applications. For such operation: new calls are routed through appropriate microcells if the mobility indices $a_i$'s for mobile units, i.e. the aggregated microcell sojourn times, are greater than the origination threshold $\tau_o$; and, new calls are routed through appropriate macrocells if the mobility indices $a_i$'s for mobile units are less than the origination threshold $\tau_o$. Thus, for call origination, microcell-macrocell selection is handled the same as for use of a single threshold as described above and shown in FIG. 4; however, the origination threshold $\tau_o$ is used in place of the single threshold $\tau$.

Since mobility of a mobile unit can change, for example a pedestrian carrying a mobile telephone may drive off in a vehicle, it is desirable for the mobility index $a_i$ to have a relatively fast response time to such changes in mobility. To this end, it is currently believed that the value of $\alpha$ should be chosen to be small, for example approximately between 0.25 and 0.3.

Figure 3B:
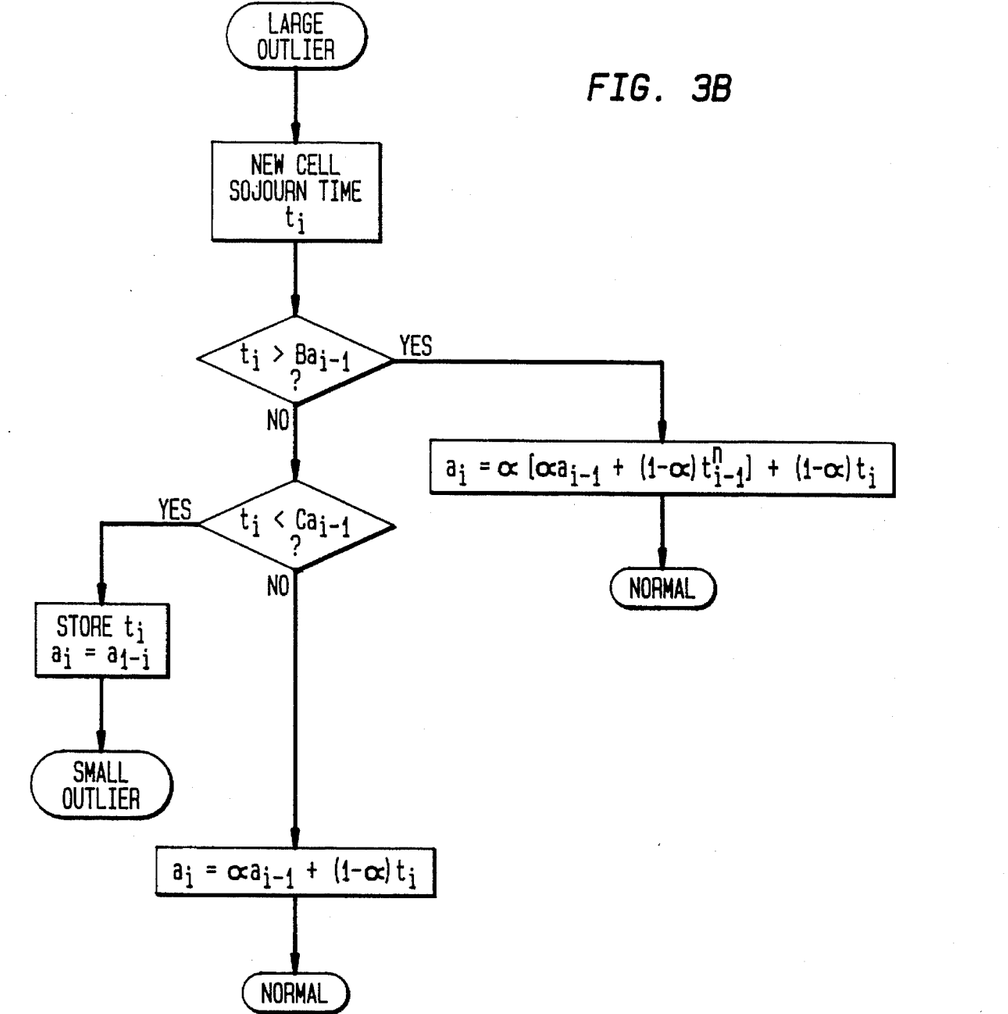
Figure 3C:
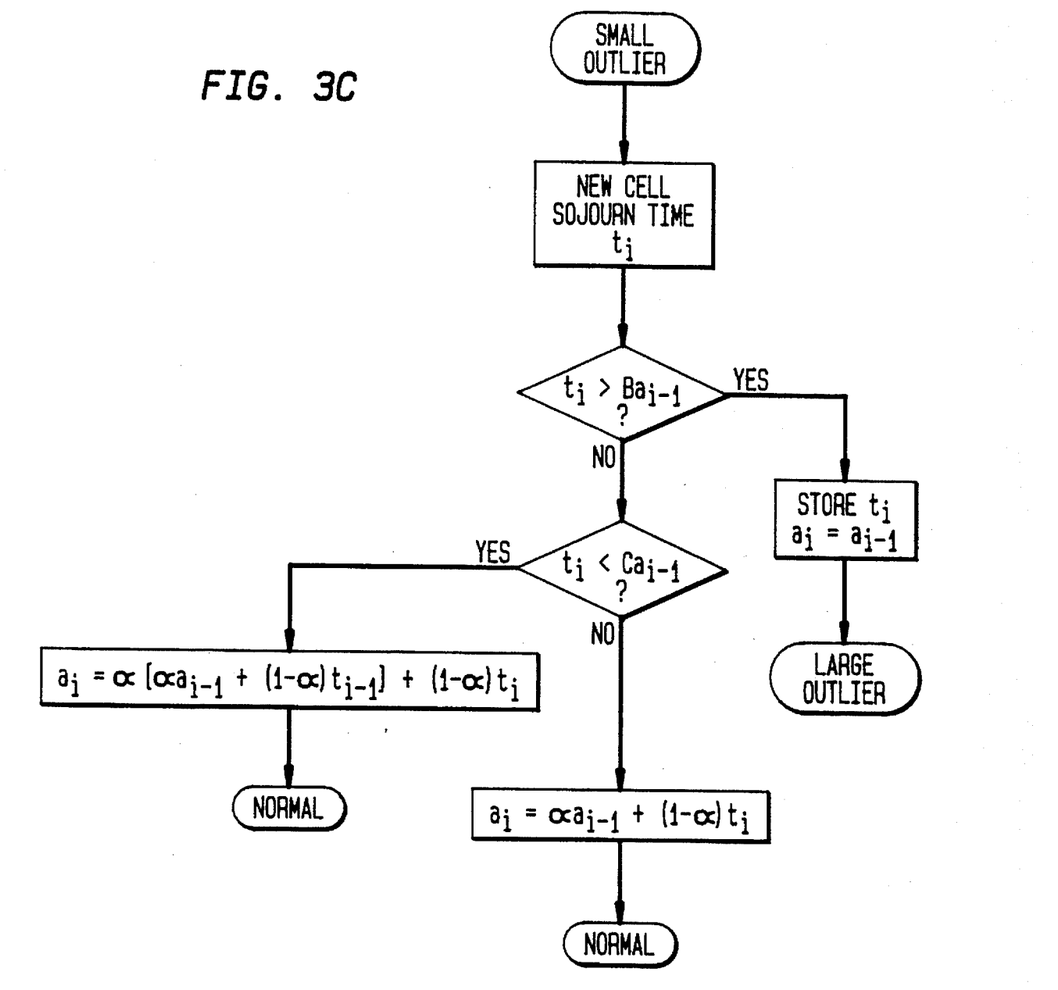

Some changes in mobility can be misleading. For example, a vehicle that is stopped at a traffic light will temporarily have a low mobility. To avoid such problems, individual $t_i$'s that are outliers by an order of magnitude are dropped from the aggregate cell sojourn times or mobility index $a_i$ as follows. If $t_i$ is found to be a factor of B bigger or a factor of C smaller than the running weighted average $a_{i-1}$ where B and C are believed to be approximately 10, the mobile unit stores the value $t_i$ without updating $a_i$. At the next microcell boundary crossing when $t_{i+1}$ is found, the mobile unit determines whether to declare $t_i$ to be an outlier or not. If it is an outlier it is discarded, otherwise the weighted average $a_{i+1}$ is updated using both $t_i$ and $t_{i+1}$. The processing of outliers is illustrated in the flow charts of FIGS. 3a–3c with FIG. 3b showing large outlier processing and FIG. 3c showing small outlier processing.

The outlier processing procedure ensures that the mobility index is both responsive to changes in the mobility of a mobile unit but also able to ignore anomalies presented by outliers. The outlier processing procedure delays the update of the weighted average or mobility index by the time $t_{i+1}$, the time spent by the mobile in the cell after the change in mobility. However, this delay is acceptable, and if the change in mobility is found to be an actual change rather than an anomaly, $t_i$ preferably is not discarded but will be included in the mobility index after the delay, and hence accounted for in the values $a_{i+1}$, $a_{i+2}$, etc. A potentially erroneous mobility index $a_i$ gets used only if a call is to be processed during the time $t_{i+1}$ between the microcell boundary crossings i and i+1.

The same operations are performed for handoff calls to determine if the calls are handed off to a neighboring cell at the same cell level, or the calls are handed up to a macrocell or down to a microcell in a hierarchical architecture system. The use of the mobility index $a_i$ is important for future cellular communications systems which will be required to provide acceptable channel quality for future multi-media calls. To this end, high mobility users must be assigned to macrocells to avoid frequent path reconfigurations due to handoffs. Also, low mobility users must be assigned to microcells to achieve high system capacity. It is apparent that the mobility index has an important bearing on microcell-macrocell assignment and permits assignments between and among microcells and macrocells.

Channel assignment also can be performed using both cell sojourn times and call holding times. The holding time of the $i^{th}$ call of a given type, such as a voice call, for a mobile unit is represented by $\{h_i:i=1,2,3,\ldots\}$. The weighted average of call holding times is represented as $b_i=\beta b_{i-1}+(1-\beta)h_i$ where $0 \leq \beta < 1$. When a mobile unit initiates a new call or requests a call handoff, it computes and transmits the ratio of $b_i/a_i$, which can be interpreted as the expected number of handoffs for each call, to a microcell base station or a macrocell base station. The ratio is compared with a second defined threshold or handoff threshold, $\tau_H$, for allocation of a channel at an appropriate cell-level hierarchy for the call in order to minimize the overall number of call handoffs in the cellular communications system 100. For this channel assignment method, if the number of handoffs expected for a call exceeds a selected number, the call is assigned to a macrocell channel; and, if the number of handoffs expected for a call does not exceed the selected number, the call is assigned to a microcell channel, see FIG. 5.

Figure 5:
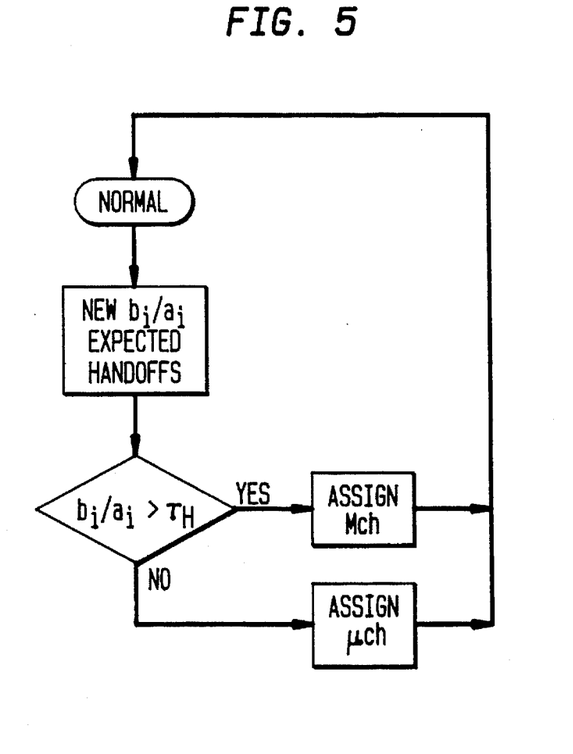
FIG. 5 is a flow chart showing assignment of a microchannel or a macrochannel based on the number of handoffs which are expected for a call.

Another handoff method is based on the number of previous handoffs. A mobile unit requesting a handoff of an ongoing call provides the microcell base station with the number of previous handoffs required by the call. If the number of previous handoffs is greater than a handoff threshold, the base station arranges a macrocell channel for the handoff call. The goal of this handoff method is to reduce the number of handoffs which may be needed for the call in the future after a defined number of handoffs have been required which should provide improved quality of service for mobile users. This handoff method is also represented by FIG. 5 with the number of previous handoffs replacing $b_i/a_i$.

The time duration of each call or call holding time can be monitored. This call holding time can be used in combination with the number of previous handoffs for a call by dividing the number of previous handoffs for a call by the call holding time to derive the previous number of handoffs per unit time which can be used for assignment of the call to a microcell channel or a macrocell channel.

Also, the average number of handoffs per call can be monitored at each mobile unit. In a similar manner, the average number of handoffs per call can be divided by the call holding time to determine the average number of handoffs per unit time for the given mobile unit. This statistic can then be used for assignment of the call to a microcell channel or a macrocell channel. These statistics can be collected as a weighted average as described above relative to other statistics and are generally represented by FIG. 5 with the previous number of handoffs per unit time or the average number of handoffs per unit time replacing $b_i/a_i$.

As described above, when a new or ongoing call is to be processed for a mobile unit, the mobile unit's mobility index $a_i$ is provided to the microcell base station or macrocell base station. Since the base station has to handle a large number of new and handoff calls, it can prioritize processing of the calls based on the values of $a_i$. For example, handoff calls from mobile units having small mobility indices $a_i$'s, i.e. those mobile units which are fast moving, should be processed before calls from other mobile units in order to help ensure that the calls are not lost.

The prioritization of handoff calls can also involve the use of call throughput and the number of failed handoffs experienced by the mobile unit as follows. Each mobile unit keeps track of the time interval between two consecutive calls associated with the unit. The sequence of such time intervals is denoted as $\{u_i:i=1,2,3,\ldots\}$. The mobile units then keep weighted sums inversely representative of call throughput: $v_i=\gamma v_{i-1}+(1-\gamma)u_i$ where $0 \geq \gamma < 1$. The call throughput for the mobile unit at the time between the $i^{th}$ call and the $i+1^{st}$ call is approximated by $1/v_i$. Similarly, the mobile units keep track of the time interval between two consecutive calls that are lost or fail at handoff. Let the time intervals between two failed handoffs be denoted by $\{w_i:i=1,2,3,\ldots\}$ and define the weighted average of time intervals between failed handoffs as $x_i=\theta x_{i-1}+(1-\theta)w_i$ where $0 \leq \theta < 1$.

Then, an estimated rate of failed handoffs for the mobile unit is $1/x_i$.

Figure 6:
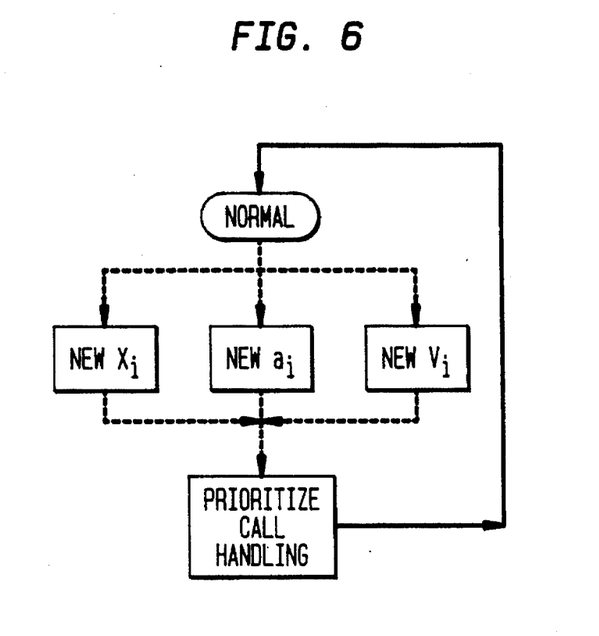
FIG. 6 is a flow chart showing prioritizations for call handling.

When the mobile unit requests handoff of an ongoing call, it sends the ratio of $v_i/x_i$, which can be interpreted as the probability of handoff failure experienced by the mobile unit, to the microcell base station or the macrocell base station. The appropriate base station can then assign higher processing priority to handoff calls with higher value $v_i/x_i$, with the hope that customers experiencing high probability of handoff failure in the past can be provided with fast response for the current handoff request in order to avoid non-uniform quality of service as perceived by various customers. These prioritizations for handling calls are illustrated in the flow chart of FIG. 6 wherein $x_i$ and $v_i$ are intended to encompass calculation and transmission of $1/x_i$, $1/v_i$ and $v_i/x_i$ as described.

Typically, an entire service area of a cellular communications system is divided into multiple, fixed network service areas each of which covers a number of microcells and/or macrocells, and mobile units can detect the area boundaries of the network service areas as they cross from one network service area to another. The area sojourn times during which a mobile unit is in a given network service area are designated as $\{y_i:i=1,2,3 \ldots \}$ wherein $y_i$ is the time a mobile unit spend in a network service area between area crossings i-1 and i. The weighted average of the area sojourn times is defined by $z_i=\zeta z_{i-1}+(1-\zeta)y_i$ where $0\leq\zeta<1$.

In a registration process, e.g. power-up, registration and location update, each mobile unit sends the current value of $z_i$ to an associated microcell base station or macrocell base station. Based on the values of $z_i$, customized customer service areas for the mobile units are defined. For example, for a particular mobile unit, the entire service area of the network can be divided into customer service areas, each of which consists of n network service areas with n being small for relatively large $z_i$ and large for relatively small $z_i$. The current customer service area for a mobile unit is defined to be the one with network service areas surrounding the current location of the mobile. As a result, a mobile unit with high mobility has a large customer service area. With reference to FIG. 1, a customer service area customized for the mobile unit 110 may be the macrocell 104 which includes all the microcells 102 surrounding the mobile unit 110. On the other hand, a customer service area customized for the mobile unit 108 may be the macrocells which surround the macrocell in which the mobile 108 is currently operating.

Since calls destined for a mobile unit are paged throughout the current customer service area, the mobile can move around within a customer service area without causing any need for location updates. Since a location update is needed when a mobile unit moves into a new customer service area, a large customer service area defined for highly mobile units implies a reduction of location updates.

In addition, the definition of customer service areas can also be based on call throughput for the mobile units. For example, during the registration process, the call throughput $1/v_i$ of a mobile unit is sent to a microcell base station or a macrocell base station. The base station can then choose the size of customer service areas n with n being high for relatively high call throughput and vice versa. The idea here is to define a large customer service area for customers with low call throughput. The potential advantage of such an arrangement is that, since not much call revenue is expected from these mobile units, large customer service areas defined for them reduces the amount of network resources spent on their location updates.

The ratio of originating calls to terminating calls associated with a mobile unit can also be used in defining the size of customer service areas. For instance, the size of customer service areas can be proportional to this ratio. The reasoning is that if most of the calls are originated from a mobile unit, it is unnecessary to keep track of a precise location of the mobile unit because the cellular communications system can page a wide area in case of occasional terminating calls destined for the mobile unit. As a result, a higher ratio of originating to terminating calls yields a larger customer service area, thus saving system resources for location updates.

Of course, the call throughput parameter $1/v_i$ and the ratio of originating to terminating calls can be used in conjunction with the area sojourn time $z_i$ in determining the size of customer service areas.

Having thus described the invention of the present application in detail and by reference to preferred embodiments thereof, it will be apparent that modifications and variations are possible without departing from the scope of the invention defined in the appended claims.

What is claimed is:

1. A method of operating a cellular communications system wherein distributed base stations couple a plurality of mobile units to a fixed switching network, said cellular communications system comprising a layered cellular mobile network having macrocells each of which overlies a plurality of microcells, said method comprising the steps of:

controlling the connections of said plurality of mobile units from said distributed base stations based on measurable mobility and teletraffic statistics of each of said plurality of mobile units;

measuring microcell sojourn times at each of said plurality of mobile units as one of said measurable mobility and teletraffic statistics;

aggregating measured microcell sojourn times representative of mobile unit mobility at each of said plurality of mobile units; and transmitting aggregated microcell sojourn times from said plurality of mobile units to said distributed base stations.

2. A method as claimed in claim 1 wherein said method further comprises the step of:

comparing aggregated microcell sojourn times to a threshold;

routing calls through appropriate microcells if aggregated microcell sojourn times are greater than said threshold; and routing calls through appropriate macrocells if aggregated microcell sojourn times are less than said threshold.

3. A method as claimed in claim 2 further comprising the steps of:

performing said steps of measuring microcell sojourn times, and aggregating microcell sojourn times at each of said plurality of mobile units whenever a mobile unit is powered-up whether the unit is idle or engaged in existing calls;

performing said step of transmitting aggregated microcell sojourn times of said mobile units from said plurality of mobile units to said distributed base stations at times of initial call set-up;

performing said step of comparing aggregated microcell sojourn times to a threshold; and setting-up initial calls on appropriate microcells if aggregated microcell sojourn times for mobile units are greater than said threshold and on appropriate macrocells if aggregated microcell sojourn times for mobile units are less than said threshold.

4. A method as claimed in claim 3 further comprising the steps of:

continuing to perform said steps of measuring microcell sojourn times, and aggregating microcell sojourn times at each of said plurality of mobile units during the progress of established calls connected over said cellular communications system;

performing said step of transmitting aggregated microcell sojourn times of said mobile units from said plurality of mobile units to said distributed base stations at times of microcell boundary crossings;

performing said step of comparing aggregated microcell sojourn times to a threshold; and handing off established calls based on said aggregated microcell sojourn times.

5. A method as claimed in claim 4 wherein the step of handing off established calls based on said aggregated sojourn times comprises the steps of:

handing off calls from one microcell to another microcell if aggregated microcell sojourn times for mobile units is greater than said threshold;

handing up calls from one microcell to a macrocell if aggregated microcell sojourn times for mobile units is less than said threshold;

handing off calls from one macrocell to another macrocell if aggregated microcell sojourn times for mobile units is less than said threshold; and handing down calls from one macrocell to a microcell if aggregated microcell sojourn times for mobile units is greater than said threshold.

6. A method of operating a cellular communications system wherein distributed base stations couple a plurality of mobile units to a fixed switching network, said cellular communications system comprising a layered cellular mobile network having macrocells each of which overlies a plurality of microcells, said method comprising the steps of:

controlling the connections of said plurality of mobile units from said distributed base stations based on measurable statistics of each of said plurality of mobile units;

measuring microcell sojourn times at each of said plurality of mobile units as one of said measurable statistics;

aggregating microcell sojourn times representative of mobile unit mobility at each of said plurality of mobile units is performed by determining a mobility index $a_i$ by recursively computing $a_i=\alpha a_{i-1}+(1-\alpha)t_i$ where $a_i$ is the mobility index, $a_{i-1}$ is the preceding mobility index, $\alpha$ is a weighting factor ranging between 0 and 1, and $t_i$ is the time the mobile unit spent in a microcell between microcell crossings i-1 and i; and transmitting aggregated microcell sojourn times from said plurality of mobile units to said distributed base stations.

7. A method as claimed in claim 6 wherein said method further comprises the steps of:

comparing each $t_i$ to $a_{i-1}$;

delaying the step of recursively computing $a_i=\alpha a_{i-1}+(1-\alpha)t_i$ until $t_{i+1}$ is determined if a $t_i$ is substantially greater than $a_{i-1}$;

recursively computing $a_i=\alpha a_{i-1}+(131\ \alpha)t_i$ if $t_{i+1}$ is also substantially greater than $a_{i-1}$; and deleting a $t_i$ which is substantially greater than $a_{i-1}$ prior to recursively computing $a_i=\alpha a_{i-1}+(131\ \alpha)t_i$ if $t_{i+1}$ is not substantially greater than $a_{i-1}$.

8. A method as claimed in claim 7 wherein the step of recursively computing $a_i=\alpha a_{i-1}+(131\ \alpha)t_i$ if $t_{i+1}$ is also substantially greater than $a_{i-1}$ is performed using both $t_i$ and $t_{i+1}$.

9. A method as claimed in claim 6 wherein said method further comprises the steps of:

comparing each $t_i$ to $a_{i-1}$;

delaying the step of recursively computing $a_i=\alpha a_{i-1}+(131\ \alpha)t_i$ until $t_{i+1}$ is determined if a $t_i$ is substantially less than $a_{i-1}$;

recursively computing $a_i=\alpha a_{i-1}+(131\ \alpha)t_i$ if $t_{i+1}$ is also substantially less than $a_{i-1}$; and deleting a $t_i$ which is substantially less than $a_{i-1}$ prior to recursively computing $a_i=\alpha a_{i-1}+(1-\alpha)$ if $t_{i+1}$ is not substantially less than $a_{i-1}$.

10. A method as claimed in claim 9 wherein the step of recursively computing $a_i=\alpha a_{i-1}+(131\ \alpha)t_i$ if $t_{i+1}$ is also substantially less than $a_{i-1}$ is performed using both $t_i$ and $t_{i+1}$.

11. A method as claimed in claim 6 further comprising the steps of:

accumulating call holding times at each of said plurality of mobile units as one of said measurable statistics;

aggregating call holding times at each of said plurality of mobile units; and transmitting aggregated call holding times to said distributed base stations.

12. A method as claimed in claim 11 wherein the step of aggregating call holding times at each of said plurality of mobile units comprises the step of determining a weighted average by recursively computing $b_i=\beta b_{i-1}+(131\ \beta)h_i$ where $b_i$ is a weighted average of call holding time, $b_{i-1}$ is the preceding weighted average of call holding time, $\beta$ is a weighting factor ranging between 0 and 1, and $h_i$ is the holding time of the $i^{th}$ call.

13. A method as claimed in claim 12 further comprising the step of dividing $b_i$ by $a_i$ to determine a ratio representative of the expected number of handoffs for each call wherein the steps of transmitting aggregated microcell sojourn times representative of the mobilities of said mobile units from said plurality of mobile units to said distributed base stations and transmitting aggregated call holding times to said distributed base stations are combined and simplified by transmitting said ratio of $b_i/a_i$.

14. A method as claimed in claim 13 further comprising the steps of:

comparing said ratio of $b_i/a_i$ to a selected handoff threshold;

assigning a call to a macrocell channel if $b_i/a_i$ exceeds said handoff threshold; and assigning a call to a microcell channel if $b_i/a_i$ does not exceed said handoff threshold.

15. A method of operating a cellular communications system wherein distributed base stations couple a plurality of mobile units to a fixed switching network, said cellular communications system comprising a layered cellular mobile network having macrocells each of which overlies a plurality of microcells, said method comprising the steps of:

controlling the connections of said plurality of mobile units from said distributed base stations based on measurable statistics of each of said plurality of mobile units;

measuring microcell sojourn times at each of said plurality of mobile units as one of said measurable statistics;

aggregating measured microcell sojourn times representative of mobile unit mobility at each of said plurality of mobile units;

transmitting aggregated microcell sojourn times from said plurality of mobile units to said distributed base stations;

performing said steps of measuring microcell sojourn times, and aggregating microcell sojourn times at each of said plurality of mobile units whenever a mobile unit is powered-up;

performing said step of transmitting aggregated microcell sojourn times of said mobile units from said plurality of mobile units to said distributed base stations at times of call set-up;

comparing aggregated microcell sojourn times to an origination threshold between a low threshold and a high threshold;

routing originating calls through appropriate microcells if aggregated microcell sojourn times are greater than said origination threshold; and routing originating calls through appropriate macrocells if aggregated microcell sojourn times are less than said origination threshold.

16. A method as claimed in claim 15 further comprising the steps of:

continuing to perform said steps of measuring microcell sojourn times, and aggregating microcell sojourn times at each of said plurality of mobile units during the progress of established calls connected over said cellular communications system;

performing said step of transmitting aggregated microcell sojourn times of said mobile units from said plurality of mobile units to said distributed base stations at times of microcell boundary crossings; and handing off established calls based on said aggregated microcell sojourn times.

17. A method as claimed in claim 16 wherein said origination threshold is between a low threshold less than said origination threshold and a high threshold greater than said origination threshold, and the step of handing off established calls based on said aggregated microcell sojourn times comprises the steps of:

comparing aggregated microcell sojourn times to said low threshold;

comparing aggregated microcell sojourn times to said high threshold;

handing off calls from one microcell to another microcell if aggregated microcell sojourn times for mobile units are greater than said low threshold;

handing up calls from one microcell to a macrocell if aggregated microcell sojourn times for mobile units are less than said low threshold;

handing off calls from one macrocell to another macrocell if aggregated microcell sojourn times for mobile units are less than said high threshold; and handing down calls from one macrocell to a microcell if aggregated microcell sojourn times for mobile units are greater than said high threshold.

18. A method of operating a cellular communications system wherein distributed base stations couple a plurality of mobile units to a fixed switching network, said cellular communications system comprising a layered cellular mobile network having macrocells each of which overlies a plurality of microcells, said method comprising the steps of:

controlling the connections of established calls on said plurality of mobile units from said distributed base stations based on measurable mobility and teletraffic statistics of each of said plurality of mobile units;

accumulating the number of previous handoffs for each call at each of said plurality of mobile units as one of said measurable mobility and teletraffic statistics;

transmitting the number of previous handoffs with each request for a handoff;

comparing the number of previous handoffs for each call to a defined threshold; and allocating a macrocell channel to calls in which the number of previous handoffs exceeds a defined handoff threshold.

19. A method as claimed in claim 18 further comprising the steps of:

accumulating call holding time for each call;

dividing the previous number of call handoffs by the call holding time to determine the number of previous handoffs per unit time per call; and utilizing the number of previous handoffs per unit time per call for macrochannel allocation.

20. A method as claimed in claim 18 further comprising the steps of:

averaging the number of handoffs per call;

accumulating call holding time for each call;

dividing the average number of call handoffs by the call holding time to determine the average number of handoffs per unit time per call; and utilizing the average number of handoffs per unit time per call for macrochannel allocation.

21. A method as claimed in claim 19 wherein the step of utilizing the number of previous handoffs per unit time per call for macrochannel allocation comprises the step of comparing the number of previous handoffs to a corresponding handoff threshold and allocating a macrochannel if the number of previous handoffs exceeds said handoff threshold.

22. A method as claimed in claim 20 wherein the step of utilizing the average number of handoffs per unit time per call for macrochannel allocation comprises the steps of:

comparing the average number of handoffs per unit time per call to a corresponding handoff threshold;

assigning a macrochannel if the corresponding threshold is exceeded; and assigning a microchannel if the corresponding threshold is not exceeded.

23. A method of operating a cellular communications system wherein distributed base stations couple a plurality of mobile units to a fixed switching network, said method comprising the steps of:

controlling system resource allocation for each of said plurality of mobile units from said distributed base stations based on measurable mobility and teletraffic communications statistics representative of each of said plurality of mobile units;

collecting measurable mobility and teletraffic communications statistics representative of each of said plurality of mobile units at each of said plurality of mobile units;

transmitting said measurable mobility and teletraffic communications statistics representative of each of said plurality of mobile units from said plurality of mobile units to said distributed base stations; and setting a customer service area based on said measurable mobility and teletraffic communications statistics.

24. A method as claimed in claim 23 wherein the step of collecting said measurable mobility and teletraffic communications statistics representative of each of said plurality of mobile units at each of said plurality of mobile units comprises the step of collecting call holding times for each of said plurality of mobile units.

25. A method as claimed in claim 24 wherein the step of setting a customer service area is based on collected call holding times.

26. A method as claimed in claim 23 wherein the step of collecting said measurable mobility and teletraffic communications statistics representative of each of said plurality of mobile units at each of said plurality of mobile units comprises the step of collecting call types for each of said plurality of mobile units.

27. A method as claimed in claim 26 wherein the step of setting a customer service area is based on collected call types.

28. A method as claimed in claim 23 wherein the step of collecting said measurable mobility and teletraffic communications statistics representative of each of said plurality of mobile units at each of said plurality of mobile units comprises the step of collecting the number of calls originated by each of said plurality of mobile units and the number of calls received by each of said plurality of mobile units.

29. A method as claimed in claim 28 wherein the step of setting a customer service area is based on the collected number of calls originated by each of said plurality of mobile units and the number of calls received by each of said plurality of mobile units.

30. A method as claimed in claim 23 wherein the step of collecting said measurable mobility and teletraffic communications statistics representative of each of said plurality of mobile units at each of said plurality of mobile units comprises the step of collecting call throughput for each of said plurality of mobile units.

31. A method as claimed in claim 30 wherein the step of setting a customer service area is based on the collected call throughput for each of said plurality of mobile units.

32. A method as claimed in claim 23 wherein the step of collecting said measurable mobility and teletraffic communications statistics representative of each of said plurality of mobile units at each of said plurality of mobile units comprises the step of collecting network service area sojourn times.

33. A method as claimed in claim 32 wherein the step of setting a customer service area is based on the collected network service area sojourn times for each of said plurality of mobile units.

34. A method of operating a cellular communications system wherein distributed base stations couple a plurality of mobile units to a fixed switching network and wherein said cellular communications system comprises a layered cellular mobile network comprising macrocells each of which overlies at least two microcells, said method comprising the steps of:

controlling system resource allocation and connections for each of said plurality of mobile units from said distributed base stations based on measurable mobility and teletraffic communications statistics representative of each of said plurality of mobile units;

collecting mobility data representative of measurable mobility and teletraffic communications statistics representative of each of said plurality of mobile units at each of said plurality of mobile units transmitting said mobility data representative of measurable mobility and teletraffic communications statistics representative of each of said plurality of mobile units from said plurality of mobile units to said distributed base stations;

comparing said mobility data to a threshold;

routing calls through an appropriate microcell if mobility data for mobile units is greater than said threshold; and routing calls through an appropriate macrocell if mobility data for mobile units is less than said threshold.

35. A method as claimed in claim 34 further comprising the steps of:

performing said step of collecting data representative of said measurable mobility and teletraffic statistics of each of said plurality of mobile units at each of said plurality of mobile units whenever a mobile unit is powered-up whether the unit is idle or engaged in existing calls;

performing said step of transmitting data representative of said measurable mobility and teletraffic statistics of each mobile unit at time of call set-up; and performing said step of comparing mobility data to a threshold such that initial call set-up is determined based on said mobility data to set-up calls on an appropriate microcell if mobility data for mobile units is greater than said threshold and to set-up calls on an appropriate macrocell if mobility data for mobile units is less than said threshold.

36. A method as claimed in claim 34 further comprising the steps of:

continuing to perform said step of collecting data representative of said measurable mobility, and teletraffic statistics of each of said plurality of mobile units at each of said plurality of mobile units during established calls;

performing said step of transmitting data representative of said measurable mobility and teletraffic statistics of each mobile unit at times of microcell boundary crossings;

performing said step of comparing mobility data to a threshold; and handing off established calls based on said mobility data.

37. A method as claimed in claim 36 wherein the step of handing off established calls based on said mobility data comprises the steps of:

handing off calls from one microcell to another microcell if mobility data for mobile units is greater than said threshold;

handing up calls from one microcell to a macrocell if mobility data for mobile units is less than said threshold;

handing off calls from one macrocell to another macrocell if mobility data for mobile units is less than said threshold; and handing down calls from one macrocell to a microcell if mobility data for mobile units is greater than said threshold.

38. A method of operating a cellular communications system wherein distributed base stations couple a plurality of mobile units to a fixed switching network, said method comprising the steps of:

controlling connections of said plurality of mobile units from said distributed base stations based on measurable mobility and teletraffic statistics of each of said plurality of mobile units;

accumulating microcell sojourn times at each of said plurality of mobile units as one of said measurable mobility and teletraffic statistics;

taking a weighted average of microcell sojourn times representative of mobile unit mobility at each of said plurality of mobile units;

transmitting weighted averages of microcell sojourn times representative of the mobilities of said mobile units from said plurality of mobile units to said distributed base stations; and prioritizing the order of performing connections of said plurality of mobile units based on said weighted averages of microcell sojourn times.

39. A method of operating a cellular communications system wherein distributed base stations couple a plurality of mobile units to a fixed switching network, said method comprising the steps of:

controlling connections of said plurality of mobile units from said distributed base stations based on measurable mobility and teletraffic statistics of each of said plurality of mobile units;

accumulating time intervals between two consecutive calls at each of said plurality of mobile units as one of said measurable mobility and teletraffic statistics;

taking a weighted average of accumulated time intervals between two consecutive calls at each of said plurality of mobile units;

accumulating time intervals between two consecutive calls which fail at handoff at each of said plurality of mobile units;

taking a weighted average of the time intervals between two consecutive calls which fail at handoff at each of said plurality of mobile units;

transmitting the ratio of weighted averages of accumulated time intervals between two consecutive calls to weighted averages of time intervals between two consecutive calls which fail at handoff from said plurality of mobile units to said distributed base stations; and prioritizing the order of performing connections of said plurality of mobile units based on the ratio of said weighted averages of accumulated time intervals between two consecutive calls to weighted averages of time intervals between two consecutive calls which fail at handoff.

40. A method of operating a cellular communications system wherein distributed base stations couple a plurality of mobile units to a fixed switching network, said method comprising the steps of:

controlling connections of said plurality of mobile units from said distributed base stations based on measurable mobility and teletraffic statistics of each of said plurality of mobile units;

accumulating mobility data at each of said plurality of mobile units as one of said measurable mobility and teletraffic statistics;

taking a weighted average of accumulated mobility data at each of said plurality of mobile units;

transmitting the weighted averages of accumulated mobility data from said plurality of mobile units to said distributed base stations; and prioritizing the order of performing connections of said plurality of mobile units based on the weighted averages of accumulated mobility data.

* * * * *